(12) United States Patent
Schuman et al.

(10) Patent No.: US 10,022,944 B2
(45) Date of Patent: Jul. 17, 2018

(54) PRINTED PACKAGING LAMINATE, METHOD FOR MANUFACTURING OF THE PACKAGING LAMINATE AND PACKAGING CONTAINER

(71) Applicant: Tetra Laval Holdings & Finance S.A., Pully (CH)

(72) Inventors: Thomas Schuman, Hjärup (SE); Anna Nilsson, Lund (SE); Ladislav Hurdalek, Lund (SE); Mikael Berlin, Lund (SE); Katarina Jonasson, Bjärred (SE)

(73) Assignee: TETRA LAVAL HOLDINGS & FINANCE S.A., Pully (CH)

(*) Notice: Subject to any disclaimer, the term of this patent is extended or adjusted under 35 U.S.C. 154(b) by 124 days.

(21) Appl. No.: 15/126,817

(22) PCT Filed: Mar. 16, 2015

(86) PCT No.: PCT/EP2015/055418
§ 371 (c)(1),
(2) Date: Sep. 16, 2016

(87) PCT Pub. No.: WO2015/140097
PCT Pub. Date: Sep. 24, 2015

(65) Prior Publication Data
US 2017/0087810 A1   Mar. 30, 2017

(30) Foreign Application Priority Data

Mar. 17, 2014 (SE) ........................................ 1450296

(51) Int. Cl.
*B32B 27/10* (2006.01)
*C09D 101/00* (2006.01)
(Continued)

(52) U.S. Cl.
CPC ................ *B32B 27/10* (2013.01); *B32B 9/02* (2013.01); *B32B 9/06* (2013.01); *B32B 23/06* (2013.01);
(Continued)

(58) Field of Classification Search
CPC ....... B32B 27/10; B32B 27/306; B32B 27/32; D21H 27/10
See application file for complete search history.

(56) References Cited

U.S. PATENT DOCUMENTS 6,207,258 B1   3/2001 Varnell
6,554,410 B2   4/2003 Jeanmaire et al.
(Continued)

FOREIGN PATENT DOCUMENTS

EP   2 679 642 A1   1/2014
EP   2 692 536 A1   2/2014
(Continued)

OTHER PUBLICATIONS

International Search Report (PCT/ISA/210) dated May 29, 2015, by the European Patent Office as the International Searching Authority for International Application No. PCT/EP2015/055418.
(Continued)

Primary Examiner — Betelhem Shewareged
(74) Attorney, Agent, or Firm — Buchanan Ingersoll & Rooney PC

(57) ABSTRACT

A laminated packaging material for food packaging, comprises a core layer of paper or paperboard, which on a first side intended to be directed towards the outside of a packaging container, has, in the following order, a dry precoating for receiving a printed décor of an aqueous, pigment-based, ink-jet printing ink, a pigment-based ink-jet printed ink décor layer and further laminated onto the printed décor layer, a protective outermost layer of a ther-
(Continued)

Figure 1A:
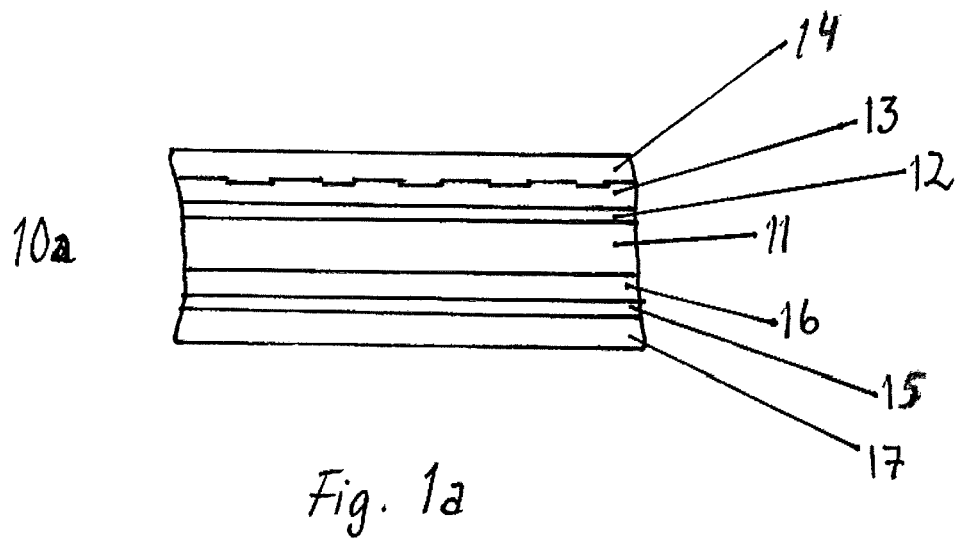

moplastic polymer. Also disclosed is a method for manufacturing of the packaging laminate and to a packaging container that is made from the laminated packaging material as well as to a pre-coating composition for use in the laminated packaging material and in the manufacturing thereof.

20 Claims, 6 Drawing Sheets

(51) Int. Cl.
| | |
|---|---|
| *C09D 103/00* | (2006.01) |
| *C09D 129/04* | (2006.01) |
| *B32B 27/30* | (2006.01) |
| *B32B 27/32* | (2006.01) |
| *B32B 9/02* | (2006.01) |
| *B32B 9/06* | (2006.01) |
| *B32B 23/06* | (2006.01) |
| *B32B 27/36* | (2006.01) |
| *D21H 27/10* | (2006.01) |
| *C09D 133/06* | (2006.01) |

(52) U.S. Cl.
CPC ............ *B32B 27/306* (2013.01); *B32B 27/32* (2013.01); *B32B 27/36* (2013.01); *C09D 101/00* (2013.01); *C09D 103/00* (2013.01); *C09D 129/04* (2013.01); *D21H 27/10* (2013.01); *B32B 2255/20* (2013.01); *B32B 2255/26* (2013.01); *B32B 2270/00* (2013.01); *B32B 2307/31* (2013.01); *B32B 2307/4023* (2013.01); *B32B 2307/518* (2013.01); *B32B 2307/718* (2013.01); *B32B 2307/728* (2013.01); *B32B 2307/7242* (2013.01); *B32B 2307/734* (2013.01); *B32B 2439/70* (2013.01); *C09D 133/06* (2013.01)

(56) References Cited

U.S. PATENT DOCUMENTS

| | | | |
|---|---|---|---|
| 7,122,225 B2 * | 10/2006 | Ohbayashi | B41M 5/52 427/411 |
| 8,431,193 B2 | 4/2013 | Romano, Jr. et al. | |
| 9,067,448 B2 | 6/2015 | Dannhauser et al. | |
| 2003/0152753 A1 * | 8/2003 | Waller, Jr. | B41M 5/52 428/195.1 |
| 2007/0087138 A1 | 4/2007 | Koenig et al. | |
| 2011/0205287 A1 | 8/2011 | Zhou et al. | |
| 2012/0114959 A1 | 5/2012 | Larsson et al. | |
| 2012/0236095 A1 | 9/2012 | Pal et al. | |
| 2013/0044157 A1 | 2/2013 | Sarkisian et al. | |
| 2013/0076842 A1 | 3/2013 | Sarkisian et al. | |
| 2013/0095333 A1 | 4/2013 | Pal et al. | |
| 2013/0192166 A1 | 8/2013 | Olsson | |
| 2013/0302630 A1 | 11/2013 | Ono | |
| 2014/0106140 A1 | 4/2014 | Ikeda et al. | |
| 2014/0295031 A1 | 10/2014 | Olsson et al. | |

FOREIGN PATENT DOCUMENTS

| | | |
|---|---|---|
| WO | WO 99/06219 A1 | 2/1999 |
| WO | WO 2009/095697 A1 | 8/2009 |
| WO | WO 2010/114467 A1 | 10/2010 |
| WO | WO 2011/019866 A1 | 2/2011 |
| WO | WO 2011/112190 A1 | 9/2011 |
| WO | WO 2011/159274 A1 | 12/2011 |
| WO | WO 2012/044229 A1 | 4/2012 |
| WO | WO 2012/047162 A1 | 4/2012 |
| WO | WO 2013/098026 A1 | 7/2013 |
| WO | WO 2015/136493 A1 | 9/2015 |

OTHER PUBLICATIONS

PCT Article 15(5), ITS 201.
"Tetra Pak—development in brief", May 14, 2013, pp. 1-86, Retrieved from the Internet: URL:http://www.tetrabak.com/DocumentBank/9704en.pdf, retrieved on May 20, 2015, pp. 56-57.

* cited by examiner

PRINTED PACKAGING LAMINATE, METHOD FOR MANUFACTURING OF THE PACKAGING LAMINATE AND PACKAGING CONTAINER

TECHNICAL FIELD

The present invention relates to laminated packaging material for food packaging, comprising a core layer of paper or paperboard, which on a first side intended to be directed towards the outside of a packaging container, has, in the following order, a dry pre-coating for receiving a printed décor of an aqueous, pigment-based, ink-jet printing ink, a pigment-based ink-jet printed décor layer and further laminated onto the printed décor layer, a protective outermost layer of a thermoplastic polymer. The invention relates also to a method of manufacturing the laminated packaging material and to a packaging container produced therefrom, as well as to a pre-coating composition for use in the laminated packaging material and in the manufacturing thereof.

BACKGROUND OF THE INVENTION

Packaging containers of the single use disposable type for liquid foods are often produced from a packaging laminate based on paperboard or carton. One such commonly occurring packaging container is marketed under the trademark Tetra Brik Aseptic® and is principally employed for aseptic packaging of liquid foods such as milk, fruit juices etc, sold for long term ambient storage. The packaging material in this known packaging container is typically a laminate comprising a bulk core layer of paper or paperboard and outer, liquid-tight and heat sealable layers of thermoplastic polymers. In order to render the packaging container gas-tight, in particular oxygen gas-tight, for example for the purpose of aseptic packaging and packaging of milk or fruit juice, the laminate in these packaging containers normally comprises at least one additional layer, most commonly an aluminium foil.

On the inside of the laminate, i.e. the side intended to face the filled food contents of a container produced from the laminate, there is an innermost layer, applied onto the gas barrier layer of aluminium foil, which innermost, inside layer may be composed of one or several part layers, comprising heat sealable adhesive polymers and/or polyolefins. Also on the outside of the core layer, there is an outermost heat sealable polymer layer.

Similar packaging containers, but without any gas barrier layer, e.g. aluminium foil, are produced for packaging of liquid food products intended for chilled storage and distribution, i.e. products marketed with a shorter shelf life.

The packaging containers are generally produced by means of modern, high-speed packaging machines of the type that form, fill and seal packages from a web or from prefabricated blanks of packaging material. Packaging containers may thus be produced by reforming a web of the laminated packaging material into a tube by both of the longitudinal edges of the web being united to each other in an overlap joint by welding together the inner- and outermost heat sealable thermoplastic polymer layers. The tube is filled with the intended liquid food product and is thereafter divided into individual packages by repeated transversal seals of the tube at a predetermined distance from each other below the level of the contents in the tube. The packages are separated from the tube by incisions along the transversal seals and are given the desired geometric configuration, normally a cuboid shape, by fold formation along prepared crease lines in the packaging material.

The main advantage of this continuous tube-forming, filling and sealing packaging method concept is that the web may be sterilised continuously just before tube-forming, thus providing for the possibility of an aseptic packaging method, i.e. a method wherein the liquid content to be filled as well as the packaging material itself are reduced from bacteria and the filled packaging container is produced under clean circumstances such that the filled package may be stored for a long time even at ambient temperature, without the risk of growth of micro-organisms in the filled product. Another important advantage of the Tetra Brik®-type packaging method is, as stated above, the possibility of continuous high-speed packaging, which has considerable impact on cost efficiency.

A layer of an aluminium foil in the packaging laminate provides gas barrier properties quite superior to most polymeric gas barrier materials. The conventional aluminium-foil based packaging laminate for liquid food aseptic packaging is the most cost-efficient packaging material, at its high performance level, available on the market today.

Among the efforts of developing alternative cost-efficient packaging materials and minimizing the amount of raw material needed for the manufacturing of packaging materials, should be mentioned barrier polymers suitable for extrusion coating or extrusion lamination, as well as pre-manufactured films from polymers having barrier properties. Further alternatives are pre-manufactured films having multiple barrier functionalities, which may replace the aluminium-foil. Previously known such examples are films combining multiple layers, which each contribute with complementing barrier properties to the final film, such as for example films having a vapour deposited barrier layer and a further polymer-based barrier layer coated onto the same substrate film. Another alternative of barrier materials are obtainable from barrier polymers that are coated in the form of a dispersion or solution in a liquid or solvent, onto a substrate, and subsequently dried into thin barrier coatings. Examples of suitable polymers for aqueous compositions are polyvinyl alcohols (PVOH), water-dispersible ethylene vinyl alcohols (EVOH) or polysaccharide-based water-dispersible or dissolvable polymers. Such dispersion coated or so called liquid film coated (LFC) layers may be made very thin, down to tenths of a gram per $m^2$, and may provide high quality, homogenous layers. Furthermore, such liquid film coated polymer layers from water-dispersible or -dissolvable polymers often provide good internal adhesion to adjacent layers, which contributes to good integrity of the final packaging container. With package integrity is generally meant the package durability, i.e. the resistance to leakage of a packaging container, but also the package barrier properties towards substances migrating through the package walls from the outside. Whatever the layer combination in a laminated packaging material to be suitable for liquid or wet food packaging, the package integrity is a very important factor for protecting the packaged food content in satisfactory manner. A main contributing property to package integrity is the adhesion between layers of the laminated packaging material, and weaknesses in this respect may open up for ingress of harmful substances in a formed, filled and sealed package, which is subsequently handled in transporting and distribution to retailers, and even to leakage of the filled product to the outside. Even if the weaknesses in adhesion would not lead to such ingress or leakage, they may cause that the appearance of the package is deteriorated, in various respects. The packages may lose their grip stiffness, lose their distinct shape of a cuboid package such that they have bulging package walls, and unsharp edges and corners, and the printed décor may be damaged by moisture or air creeping in between the printed décor and the covering, protective polymer layer.

Another type of package that has high demands on package integrity is the package made from carton-based laminated packaging materials which are durable for sterilisation of filled packages in autoclave of retort treatment, intended for packaging of soups, pastes and semi-solid food as well as solid, wet food products.

The appearance of the above described packages is dependent on the printed décor of the packaging container. The printed décor, is conventionally applied by means of high-speed flexography processes or to a decreasing extent by off-set printing processes. These printing processes are designed for high-speed printing of wide substrate webs of several meters in e.g. packaging material manufacturing plants, and have in common that they require complex pre-printing set-up activities by the production of imaged "negative" printing plates that will transfer the ink and printing pattern to the substrate, in order to provide a desired décor for a certain product to be packed, and each design or colour change in the printed décor requires a change also in the pre-printing plate and print forme preparations.

A more flexible way of printing is the printing by ink-jet technology, according to which printing heads a jetting the ink onto the substrate in a controlled manner, by direct control by computer signals. This technology thus eliminates the whole pre-printing operations of preparing and mounting imaged printing plates onto printing forms, and is replaced by direct digital control of the printing operation. Hitherto, the ink-jet technology has not been suitable for the printing of wide-web substrates moving at high speeds, as is the case in the manufacturing of laminated packaging materials, but recent ink-jet technology developments have opened up for entering also into this area. Some research and development has been done in this respect of providing good image quality also at high speeds of various substrates, but the technology has still failed in the lamination of the printed substrates into laminated material structures, due to bad adhesion between the printed décor layer and the next layer of a coating or a film of a thermoplastic polymer in the laminated material. The bad adhesion between the printed décor layer and the outermost, protective, thermoplastic polymer layer or film of a packaging laminate would have bearing also on the above described property of package integrity, since the packaging material for a liquid or wet food packaging container of the form-fill-seal type, could delaminate and in particular destroy the printed décor appearance towards the outside and the customers and consumers, in addition to also creating risk areas for ingress or leakage around openings and sensitive areas of the formed, filled and sealed package.

For various reasons of image and print quality of the ink-jet printing technology, it has proven necessary to pre-treat the substrate surface with a pre-coating solution and optionally drying it, before printing with the ink-jet ink.

Inkjet inks are characterized by low viscosity, low solids, and aqueous solvent. When glossy or semi-glossy papers are printed with inkjet inks that comprise as much as 90-95% water as the carrier solvent, the inks have a tendency to sit on the surface of the coating, rather than penetrate into the coating and/or underlying paper substrate.

Because the inks printed on a water-resistant receiver dry primarily by evaporation of the water without any significant penetration or absorption of the water into the coating or paper, a number of problems are encountered. One such problem is that the individual ink droplets slowly spread laterally across the surface of the coating, eventually touching and coalescing with adjacent ink droplets. This gives rise to a visual image quality artifact known as "coalescence" or puddling. Another problem encountered when inks dry too slowly is that when two different color inks are printed next to each other, such as when black text is highlighted or surrounded by yellow ink, the two colors tend to bleed into one another, resulting in a defect known as "intercolor bleed." Yet another problem is that when printing at high speed, either in a sheet fed printing process, or in a roll-to-roll printing process, the printed image is not dried sufficiently before the printed image comes in contact with an unprinted surface, and ink is transferred from the printed area to the unprinted surface, resulting in "ink retransfer".

In contrast to glossy papers, some unlaminated papers have matte surfaces that are very porous. In particular, the uncoated, unlaminated liquid paperboards for use in laminated liquid packaging materials, have a porous and a highly absorbing print surface. In this case, the colorant of aqueous inkjet inks tends to absorb deeply into the paper, resulting in a substantial loss of optical density and as a consequence, reduced color gamut.

High speed continuous inkjet printing processes have been developed that are suitable for high speed, mid-volume printing and have become of interest to the commercial printing industry. The requirements of commercial printing industry include, among others, image quality in terms of high optical density, broad color gamut, sharp detail, and minimal problems with coalescence, smearing, feathering and the like. Operationally, the printing process strives for low environmental impact, low energy consumption, fast drying, and so forth. The resulting print exhibits durability, resisting abrasion when dry or if wetted.

A surface treatment of a glossy, matte or porous paper substrate is thus necessary to fix the colorant pigments or the inkjet ink to the substrate surface and to enable high-quality inkjet printing. Untreated, i.e. not pre-coated, paper does not maintain the ink colorant at the surface, but allows significant penetration of the colorant into the interior of the paper, resulting in a loss of optical density and a low-quality image. Moreover, ink penetrates non-uniformly into the paper due to the heterogeneous nature of the paper, giving rise to mottle, which further degrades the image.

However, when further attempted to laminate the printed substrate surface to a further layer or a film of a thermoplastic polymer, it has been seen that the adhesion is insufficient between the printed ink and the outermost protective thermoplastic polymer layer. Such an outermost protective thermoplastic polymer layer is necessary in e.g. liquid food packaging, to proved liquid barrier towards wet conditions on the outside of the package and to provide heat sealability in the form-fill-seal packaging process.

DISCLOSURE OF THE INVENTION

It is, therefore, an object of the present invention to overcome or alleviate the above-described problems.

It is a general object of the invention to provide a laminated packaging material that is printed with an ink-jet method, and which has good adhesion between the printed ink décor layer and the outermost layer or film, of thermoplastic polymer, which is applied onto the printed ink décor layer.

Especially, it is an object to provide an inkjet printed laminated packaging material which has good adhesion between the printed ink décor layer and the outermost layer or film of thermoplastics, as well as good image quality.

It is a thus an object of the invention to provide an ink-jet printed laminated packaging material with good image quality as well as good integrity between the layers of the laminate.

It is a further object of the invention is to provide a packaging container from a laminated packaging material, having good package integrity as well as an ink-jet printed décor layer with high image quality.

Another object of the invention is to provide a method of surface treating, by pre-coating, a substrate to be printed with ink-jet technology, to improve the adhesion properties after an extrusion coating or lamination process of a thermoplastic polymer layer, which is applied onto the printed décor layer surface.

An additional object is to provide adhesion between the ink-jet ink formulation and the substrate to be printed as well as adhesion to a thermoplastic coating, after an extrusion coating or lamination process, in which the thermoplastic coating is applied onto the printed décor layer surface These objects are thus attained according to the present invention by the laminated packaging material, the packaging container, the method of manufacturing the packaging material and the use of a pre-coating composition, as defined in the appended claims.

According to a first aspect of the invention, the general objects are attained by the disclosed laminated packaging material.

According to a further aspect of the invention, there is provided a packaging container, manufactured from the laminated packaging material of the invention, having good package integrity and internal adhesion between the laminated layers and a high quality printed image décor.

According to yet a further aspect of the invention, there is provided a method for manufacturing of the laminated packaging material.

According to a further aspect of the invention, there is a provided a pre-coating solution for use in a laminated packaging material.

DETAILED DESCRIPTION

A laminated packaging material for food packaging, according to the invention, thus comprises a substrate layer, which on the surface of its first side, intended to be directed towards the outside of a packaging container made from the packaging material, has applied to it, in the following order, a pre-coating for receiving a printed décor layer of an aqueous pigment-based ink-jet printing ink, a pigment-based ink-jet printed décor layer and further laminated onto the printed décor layer, an outermost layer of a thermoplastic polymer, wherein the pre-coating composition comprises an aqueous soluble multivalent cation salt and the applied salt concentration at the substrate surface is from 0.02 to 0.1 g/m$^2$, preferably from 0.02 to 0.05 g/m$^2$, dry coating weight.

According to an embodiment of the invention, the substrate is a paper or paperboard constituting a core layer of the laminated packaging material.

According to a further embodiment, the pre-coating composition comprises an aqueous soluble multivalent cation salt and a polymer binder at a weight ratio of 1:20 to 3:5 (preferably from 1:5 to 2:5) calculated on solid matter, and is applied onto the substrate surface at from 0.1 to 0.5 g/m$^2$ (preferably from 0.1 to 0.3 g/m$^2$) total dry coating weight.

According to another embodiment, the substrate comprises a layer of paper or paperboard which is laminated or coated with a layer or film of a polymer on its first side, which constitutes the substrate surface for the pre-coating for receiving the ink-jet printed décor layer.

According to yet another embodiment, the substrate layer is further laminated to an innermost layer of a thermoplastic polymer on its second side, which is intended to be directed towards the inside of a packaging container.

According to a further embodiment of the invention, the laminated packaging material has an additional gas barrier layer between the substrate layer and the innermost layer.

While the pre-coating used according to the invention is believed to improve the inkjet printing performance on a wide variety of substrates, it has been found to also enable good adhesion between the printed ink and a thermoplastic polymer layer coated or laminated on top over the printed ink layer.

Advantageously, the relatively low coating weights used in the pre-coating of the invention helps maintain the relative glossy or matte surface of the employed substrate.

Paperboard and paper substrates suitable for producing the laminated packaging material of the invention, may include bleached or unbleached fibers or both, and may also comprise a pigment coating, e.g. a clay coating. The ply grammage varies typically between 30-400 g/m$^2$, depending on the targeted type and size of the packaging container.

According to an embodiment of the invention, the laminated packaging material has a core layer of a paperboard suitable for liquid food packaging, and according to a specific embodiment, the paperboard itself is the substrate for the pre-coating and inkjet printing operations.

In various embodiments, the substrate can thus be readily hydrophilic and capable of adsorbing and transferring ink colorant to the substrate interior prior to being coated thereon with the pre-coating used in the invention, such as when the substrate is a paper with a porous surface.

Alternatively, the substrate can be substantially impermeable to water or aqueous ink, such as a non-porous plastic film. In an embodiment of the invention, the substrate comprises a relatively hydrophobic coated surface prior to being coated thereon with the pre-coating, and the pre-coating provides a continuous relatively hydrophilic surface.

While the invention is in certain embodiments directed towards the use of coated papers as the substrate, the pre-coating used in the invention may also be used in combination with uncoated paper or other plain papers. Further, the invention may also be used with substrates, such as polymer-coated paper or polymer films. Opaque or transparent printing substrates include plain paper, coated paper, synthetic paper, melt-extrusion-coated paper, laminated paper, and pre-manufactured polymer films such as biaxially oriented films or laminates thereof.

Pre-manufactured films include biaxially oriented polyolefin films, typically polypropylene. Transparent supports include cellulose derivatives, e.g., a cellulose ester, polyesters, such as poly(ethylene terephthalate), polyimides; polyamides; polyolefins, such as polyethylene or polypropylene; and combinations thereof. The kind of paper substrates listed above include a broad range of papers, from low to high end papers, in particular paper or paperboard intended for liquid food packaging.

The pre-coating composition is applied to the outer side of the substrate, i.e. the side to be directed towards the outside of a packaging container from the material comprising the printed substrate. The method employed to accomplish the pre-coating can be selected from a number of known techniques, including but not limited to spraying, rod coating, roll coating, blade coating, gravure coating (direct, reverse, and offset), flexographic coating, size press (puddle and metered), and curtain-coating.

The coating uniformity is greater when a flexography application system is used, allowing for a reduced coating weight at a constant level of print quality performance. A reduced coating weight, contributes to improving the adhesion between the decor layer and the outermost protective layer of a thermoplastic polymer.

In one embodiment, in which a paper is the substrate surface to be printed, the pre-coating can be applied in line as part of the paper manufacturing process. In another embodiment, the pre-coating may be coated as a separate coating step subsequent to the paper (or other substrate) manufacture. In a particular embodiment, the pre-coating may be applied inline as part of the inkjet printing operation, wherein such a pre-coating is applied to a substrate in a pre-coating station prior to printing of inkjet inks. Such inline application may be performed by the various coating processes identified above, or alternatively by a printhead positioned in line with the ink-applying printheads. When a printhead is used to apply the coating solution, the option exists of covering only the printed image area with the coating material, rather than the entire area of the substrate.

The application of a pre-coating provides the advantage of eliminating color-to-color bleed during imaging, since the colorants of the ink are fixed instantaneously as the ink contacts the pre-coated substrate. Furthermore, with pre-coating, images appear darker and have sharper edge definition, since the coating minimizes ink penetration and allows more fixed colorant on the surface. Finally, while the pre-coat material may optionally be dried completely before image printing, complete drying of the pre-coated substrate may not be necessary. Therefore, drying can alternatively be applied in only one operation after imaging, or with an intermediate light drying after pre-coating and final drying after printing, resulting in considerable savings in energy. A safer per-coating and printing process involves two proper drying steps, one after the pre-coating step and one after the printing operation. An in-line pre-coating drying operation may be carried out by using air drying or infrared drying technology, or a combination of both. The drying is suitably carried out at a drying temperature of from 50 to 100° C., in terms of web surface temperature at the exit of the drying operation.

The pre-coating of the surface substrate to be printed used in the invention includes a water-soluble salt of a multivalent metal. Water-soluble is herein defined as at least 0.5 g of the salt capable of dissolving in 100 ml water at 20° C. The salt is preferably essentially colorless and non-reactive. More preferably, the multivalent metal is a cation selected from $Mg^{+2}$, $Ca^{+2}$, $Ba^{+2}$, $Zn^{+2}$, and $Al^{+3}$, most preferably $Ca^{+2}$ or $Mg^{+2}$ in combination with suitable counter ions. Examples of the salt used in the invention include (but are not limited to) calcium chloride, calcium acetate, calcium nitrate, magnesium chloride, magnesium acetate, magnesium nitrate, barium chloride, barium nitrate, zinc chloride, zinc nitrate, aluminum chloride, aluminum hydroxychloride, and aluminum nitrate. Similar salts will be appreciated by the skilled artisan. According to an embodiment of the invention, suitable salts are $CaCl_2$, $Ca(CH_3CO_2)_2$, $MgCl_2$, $Mg(CH_3CO_2)_2$, $Ca(NO3)_2$, or $Mg(NO3)_2$, including hydrated versions of these salts. Combinations of the salts described above may also be used. According to a further embodiment, of the invention, suitable salts are calcium, magnesium or aluminium salts with chloride or acetate counter ions.

The pre-coating preferably comprises calcium ion equivalent to at least 0.02 g/m² and at most 0.1 g/m² of calcium chloride.

According to an embodiment the concentration calcium chloride salt at the substrate surface is from 0.02 to 0.1 g/m². According to a further embodiment, the concentration calcium chloride salt at the substrate surface is from 0.02 to 0.05 g/m².

By employing surface sensitive techniques to analyze surfaces, the elemental composition of the pre-coated substrate surface may be determined. Time-of-flight secondary ion mass spectroscopy (ToF-SIMS), secondary ion mass spectroscopy (SIMS), electron spectroscopy for chemical analysis (ESCA), or scanning electron microscopy coupled with energy dispersive X-ray spectroscopy (SEM-EDX) are suitable characterization methods for this purpose. Furthermore, depth-profiling techniques and/or by microtome cutting procedures may also provide elemental distribution and an estimate of the layer thickness. These analytical tools are commonly used within research laboratories, institutes and universities since the 1980's.

The pre-coating composition used in the invention further includes a polymer binder. According to one embodiment, the binder is a cross-linked hydrophilic polymer binder alone or in combination with one or more additional binders. Such hydrophilic polymer binder comprises a polymer capable of adsorbing water, and preferably is capable of forming a continuous phase solution. Non-exclusive examples of such materials include gelatin, hydroxycelluloses, polyvinyl alcohol, modified polyvinyl alcohol, water dispersible ethylene vinyl alcohol (EVOH), polysaccharides, including cellulose, cellulose derivatives, carboxymethyl cellulose (CMC), starch, starch derivatives, acrylic-based (co-)polymers, polyvinyl pyrrolidone, polyethylene imine, polyvinyl amine, and derivatives of these materials, and combinations of two or more of any of these compounds. According to one embodiment of the invention, the polymer binder comprises a polymer having hydroxyl-functional groups. According to one embodiment, the binder is Gohsefimer Z-320 from Nippon Gohsei, an acetylacetate-modified polyvinyl alcohol. According to one embodiment, the binder is a crosslinked polyvinyl alcohol having a saponification degree from 79% to 99.99%.

A water-adsorbing hydrophilic polymer in the pre-coating formulation used in the invention is advantageously cross-linked to improve the print resistance to abrasion while wet, as well as to provide increased cohesiveness of the coating upon drying. The identity and amount of crosslinker will depend on the choice of polymer and its reactivity with the crosslinker, the number of crosslinking sites available, compatibility with other solution components, and manufacturing constraints such as solution pot life and coating drying speed. Non-exclusive examples of crosslinker materials are dialdehydes such as glyoxal, Cartabond TSI (Clariant), Cartabond EPI (Clariant), Sequarez 755 (Omnova), glutaraldehyde sodium bisulfate complex (Aldrich), Sunrez 700M (Omnova), Sunrez 700C (Omnova), CR-5L (Esprix), bis (vinyl) sulfone, bis(vinyl) sulfone methyl ether, adipoyl dihydrazide, epichlorohydrin polyamide resins and urea-formaldehyde resins. In a particular embodiment, the cross-linked hydrophilic polymer comprises a cross-linked aceto-acetylated polyvinyl alcohol polymer, such as aceto-acetylated polyvinyl alcohol polymer cross-linked with a glyoxal compound.

While the use of a multivalent metal salt and hydrophilic cross-linked polymeric binder in a pre-coating composition in accordance with the above specifications itself has been found to provide advantageous performance, in further embodiments, the pre-coating may alternatively comprise a polymer latex filler such as polyurethane latex, vinylacetate-ethylene copolymer latex, acrylic (co-)polymer, vinylacetat copolymer, polyester and styrene-acrylic latex polymer dispersions for improved water resistance and image durability.

When present, however, the fraction of additional latex filler preferably does not exceed 75% of the total polymer in the pre-coating, to avoid undesired decrease in maximum density and increase in mottle upon printing with pigment-based inkjet inks. In a particular embodiment, polyurethane or other polymer latexes comprising anionic groups may be employed in combination with a polyamide/epichlorohydrin resin, to improve stability of the polymer dispersion in the presence of other cationic compounds.

Other additives that may form part of the pre-coating composition are corrosion inhibitors and surfactants. According to one embodiment, a non-ionic ethoxylated alcohol surfactant is used. Non-ionic surfactants do not interfere with the salt cations and are therefore preferred.

According to an embodiment of the present invention, the pre-coating composition comprises 80-90 wt % of water and is thus very low in viscosity and requires removal of a lot of water from the substrate surface before printing.

In the inkjet printing operation, the above-described pre-coated substrate is printed with an inkjet printer employing at least one pigment-based colorant in an aqueous ink composition. Preferably, the pigment-based colorants are stabilized using anionic dispersants. Such dispersants can be polymeric, containing repeating sub-units, or may be monomeric in nature. The printing method may employ a continuous high-speed commercial inkjet printer, for example, in which the printer applies colored images from at least two different print heads, in sequence in which the different colored parts of the images are registered.

One type of printing technology, commonly referred to as "continuous stream" or "continuous" inkjet printing, uses a pressurized ink source that produces a continuous stream of ink droplets. Conventional continuous inkjet printers utilize electrostatic charging devices that are placed close to the point where a filament of working fluid breaks into individual ink droplets. The ink droplets are electrically charged and then directed to an appropriate location by deflection electrodes having a large potential difference. When no print is desired, the ink droplets are deflected into an ink-capturing mechanism (catcher, interceptor, gutter, etc.) and either recycled or disposed of. When print is desired, the ink droplets are not deflected and allowed to strike a print medium.

Alternatively, deflected ink droplets may be allowed to strike the print media, while non-deflected ink droplets are collected in the ink capturing mechanism.

Typically, continuous inkjet printing devices are faster than droplet on demand devices and produce higher quality printed images and graphics. However, each color printed requires an individual droplet formation, deflection, and capturing system. Such continuous inkjet printing devices employ a highspeed inkjet printing substrate transport system capable of transporting at least one of roll-fed or sheet fed substrate, in combination with a continuous inkjet printhead for image-wise printing of inkjet ink onto the substrate and a drying station for drying of the printed image. Use of a pre-coating in accordance with the present invention in such a high speed continuous inkjet printing device advantageously enables an aqueous pigment-based printed inkjet image to be initially stabilized upon the surface of the substrate until the printed image can be dried in the device drying station to result in improved image quality, especially when printing on substrates comprising relatively hydrophobic coated papers or aqueous ink impermeable plastic films.

A more recent development in continuous stream inkjet printing technology is disclosed in U.S. Pat. No. 6,554,410 to Jeanmaire, et al. The apparatus includes an ink-drop-forming mechanism operable to selectively create a stream of ink droplets having a plurality of volumes. Additionally, a droplet deflector having a gas source is positioned at an angle with respect to the stream of ink droplets and is operable to interact with the stream of droplets in order to separate droplets having one volume from ink droplets having other volumes. One stream of ink droplets is directed to strike a print medium and the other is directed to an ink catcher mechanism.

The colorant systems of the inkjet ink compositions employed in accordance with one embodiment of the invention may be dye-based, pigment-based or combinations of dye and pigment.

Compositions incorporating pigment are particularly useful. Pigment-based ink compositions are used because such inks render printed images having higher optical densities and better resistance to light and ozone as compared to printed images made from other types of colorants. A wide variety of organic and inorganic pigments, alone or in combination with additional pigments or dyes, can be used in the present invention. The exact choice of pigments will depend upon the specific application and performance requirements such as color reproduction and image stability.

Pigments suitable for use in the invention include, but are not limited to, azo pigments, monoazo pigments, di-azo pigments, azo pigment lakes, |3-Naphthol pigments, Naphthol AS pigments, benzimidazolone pigments, di-azo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black. In accordance with one embodiment of the invention, colorants comprising cyan, magenta, or yellow pigments are specifically employed. The pigment particles useful in the invention may have any particle sizes which can be jetted through a print head. Preferably, the pigment particles have a mean particle size of less than 0.5 micron, more preferably less than 0.2 micron.

Self-dispersing pigments that are dispersible without the use of a dispersant or surfactant can be used in the invention. Pigments of this type are those that have been subjected to a surface treatment such as oxidation/reduction, acid/base treatment, or functionalization through coupling chemistry. The surface treatment can render the surface of the pigment with anionic, cationic or non-ionic groups such that a separate dispersant is not necessary.

Pigment-based ink compositions employing non-self-dispersed pigments that are useful in the invention may be prepared by any method known in the art of inkjet printing. Dispersants suitable for use in the invention in preparing stable pigment dispersions include, but are not limited to, those commonly used in the art of inkjet printing. For aqueous pigment-based ink compositions, particularly useful dispersants include anionic surfactants such as sodium dodecylsulfate, or potassium or sodium.

Polymeric dispersants are also known and useful in aqueous pigment-based ink compositions. Polymeric dispersants include polymers such as homopolymers and copolymers; anionic, cationic or nonionic polymers; or random, block, branched or graft polymers. The copolymers are designed to act as dispersants for the pigment by virtue of the arrangement and proportions of hydrophobic and hydrophilic monomers. The pigment particles are colloidally stabilized by the dispersant and are referred to as a polymer dispersed pigment dispersion. Polymer stabilized pigment dispersions have the additional advantage of offering image durability once the inks are dried down on the ink receiver substrate.

Preferred copolymer dispersants are those where the hydrophilic monomer is selected from carboxylated monomers. Preferred polymeric dispersants are copolymers prepared from at least one hydrophilic monomer that is an acrylic acid or methacrylic acid monomer, or combinations thereof. Preferably, the hydrophilic monomer is methacrylic acid.

Inkjet inks in accordance with the invention may contain further additives as is conventional in the inkjet printing art.

According to the invention, the laminated packaging material thus has an outermost layer of a thermoplastic polymer. In the case of liquid or semi-solid food packaging, the major role of this outermost thermoplastic polymer layer is to enable heat sealing of the package walls to each other and fulfil the requirements on package integrity in packaging of such products for long term storage. According to an embodiment of the invention, the thermoplastic polymer is a polyolefin, preferably a heat sealable grade of polyethylene, polypropylene, blends of different such grades or copolymers from based on ethylene and/or propylene.

The substrate layer to be pre-coated and printed, may be further laminated to an innermost layer of a thermoplastic polymer on its second side, which is intended to be directed towards the inside of a packaging container. The thermoplastic polymer of the innermost layer may comprise the same or different polymer(s) as in the outermost layer, and the preferable choice are polyolefins.

According to a further embodiment of the laminated packaging material according to the invention, it has an additional gas barrier layer between the substrate layer and the innermost layer, most commonly an aluminium foil, but alternative non-foil barrier layers are possible alternatives.

According to a further aspect of the invention, a laminated packaging material is manufactured by the method comprising the steps of
providing a moving web of a material substrate to be printed with an aqueous pigment-based ink-jet décor layer,
continuously applying onto the moving substrate surface, an aqueous pre-coating composition containing an aqueous soluble multivalent cation salt, such that the salt concentration at the substrate surface is from 0.02 to 0.1 $g/m^2$, or from 0.02 to 0.05 $g/m^2$, dry coating weight,
transporting the thus pre-coated substrate web through a drying station in order to, at least partially, dry the applied aqueous pre-coating composition by evaporating off the water,
printing the pre-coated and dried substrate surface with an aqueous pigment-based ink-jet décor layer,
transporting the accordingly pre-coated and printed substrate web through a drying station in order to evaporate off the water from the printed décor layer, and
applying onto the pre-coated and subsequently ink-jet printed substrate a layer of a thermoplastic polymer.

According to an embodiment of the invention, the aqueous pre-coating composition contains a polymer binder dispersed or dissolved in water and an aqueous soluble multivalent cation salt, the weight ratio of salt to polymer binder being from 1:20 to 3:5, preferably from 1:10 to 3:5, more preferably from 2:10 to 2:5, and is applied onto the substrate surface in such a way that the total applied coating is from 0.1 to 0.5 $g/m^2$, preferably from 0.1 to 0.3 $g/m^2$, dry coating weight.

According to an embodiment of the invention, the moving web of a substrate to be printed with an aqueous pigment-based ink-jet décor layer, comprises a core layer of paper or paperboard, optionally coated or laminated with a layer or film of thermoplastic polymer on a first side of a the core layer.

According to an embodiment of the invention, the step of continuously applying the aqueous pre-coating composition onto the moving substrate surface, is carried out by means flexography technology, including applying the aqueous pre-coating composition by means of an anilox roller.

According to another embodiment of the invention the step of drying the applied aqueous pre-coating composition is carried out by means of air drying, infrared radiation drying or a combination of these two methods.

According to another embodiment of the invention the step of printing the pre-coated and optionally dried substrate surface is made with an ink-jet printer and carried out by transporting the pre-coated and dried substrate web by an ink-jet printhead applying the ink composition onto the substrate surface, and subsequently transporting the printed substrate surface through a drying station.

According to another embodiment of the invention the ink-jet printer is a continuous high-speed inkjet printer and the ink-jet printer applies colours from at least two different print heads in sequence in which different coloured parts of an image printed on the substrate surface are registered.

According to an embodiment of the invention the step of coating the pre-coated and subsequently printed décor layer with an outermost layer or film of a heat sealable thermoplastic polymer material is carried out by means of melt extrusion coating of a thermoplastic polymer onto the printed décor layer.

Figure 1B:
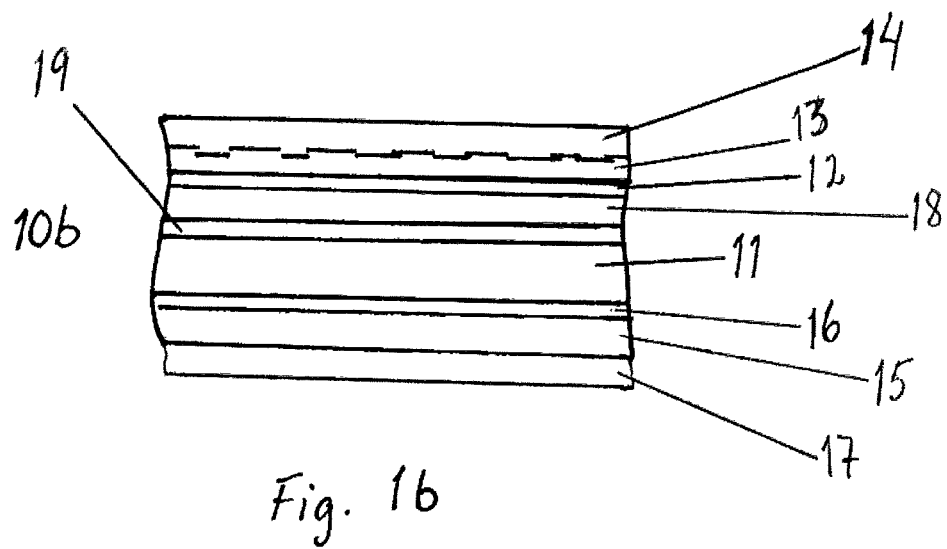
Figure 2:
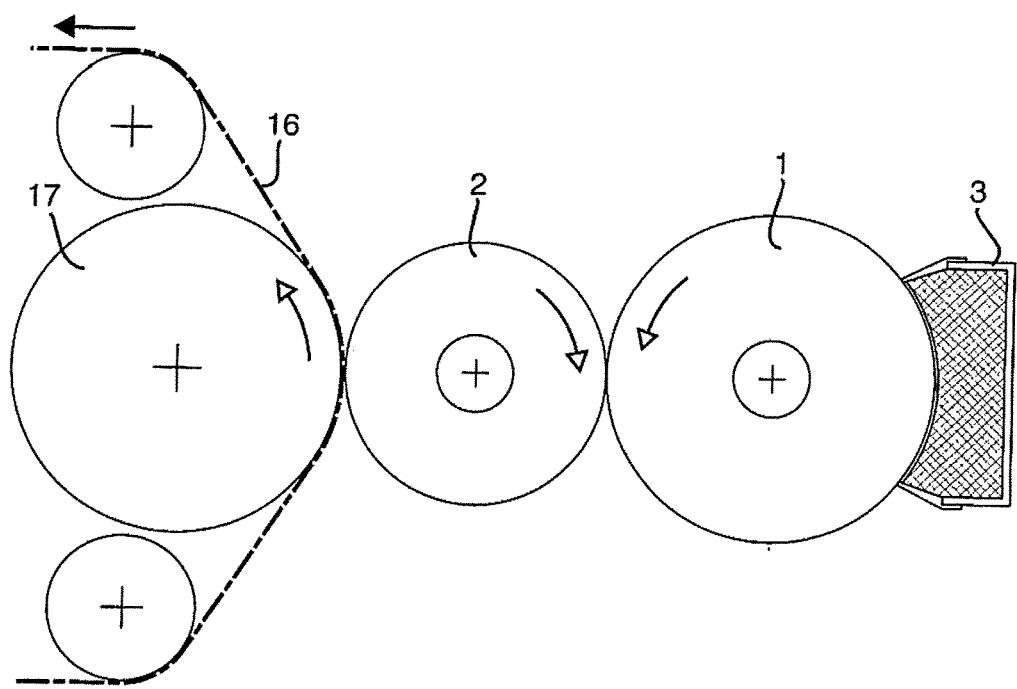
Figure 3:
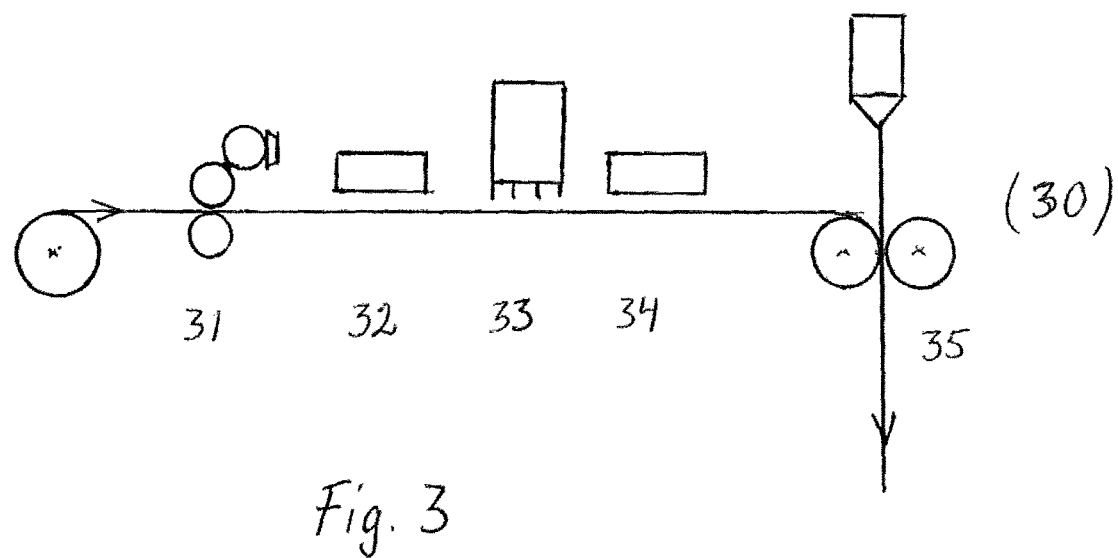
Figure 4A:
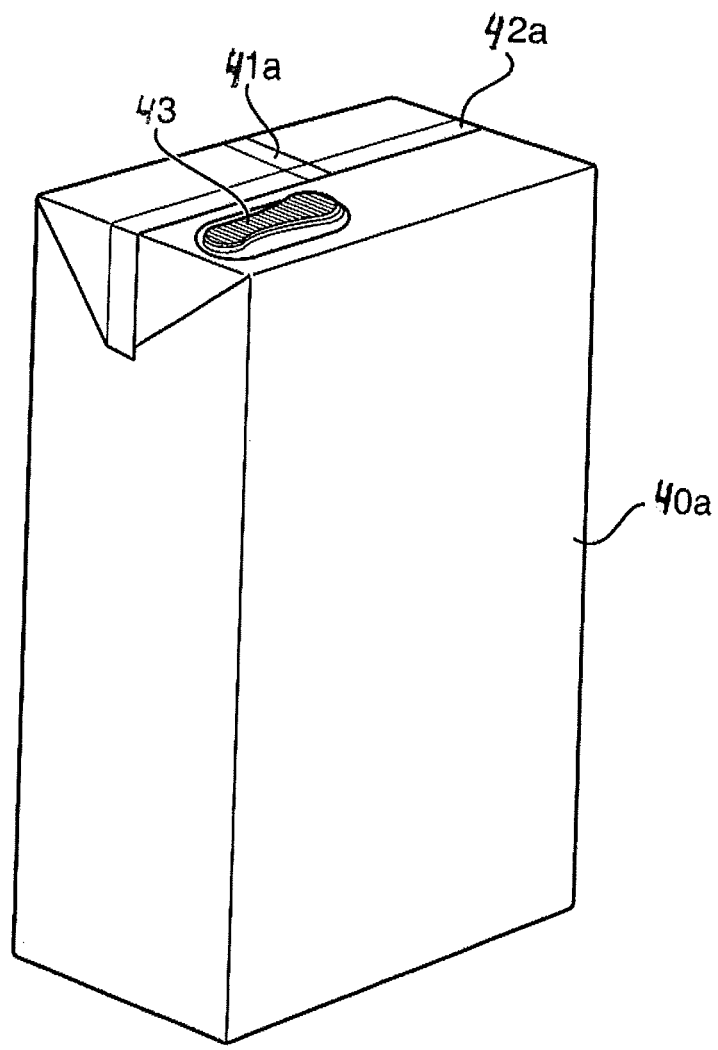
Figure 46:
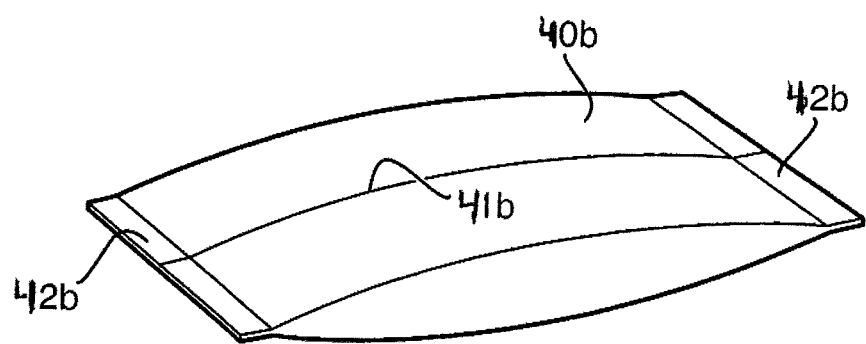
Figure 5:
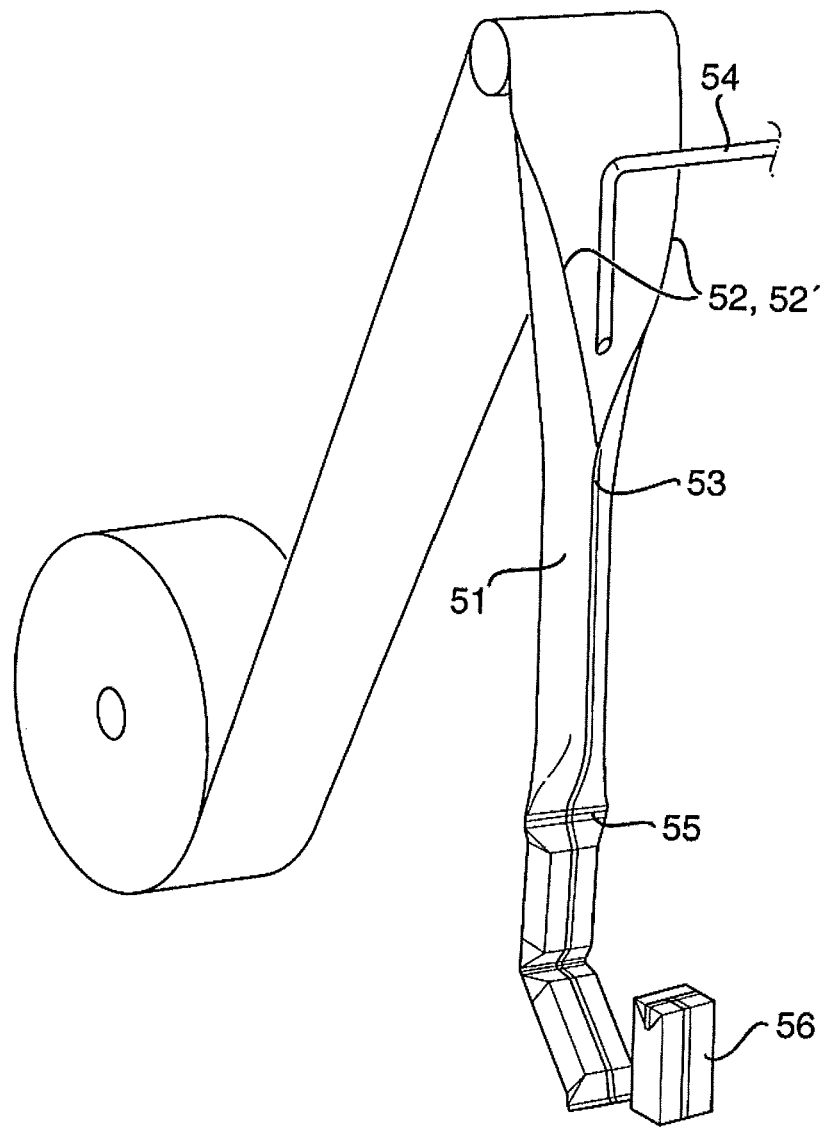

In the following, preferred embodiments of the invention will be described with reference to the drawings, of which:

FIGS. 1a and 1b are schematically showing, in cross-section, different embodiments of a laminated packaging material produced according to the invention, FIG. 2 is grammatically showing a method of flexography coating of a pre-coating composition onto a substrate layer, FIG. 3 is schematically showing the method of manufacturing the packaging laminates described in FIGS. 1a, FIGS. 4a and 4b are showing examples of packaging containers produced from the packaging laminate according to the invention, and FIG. 5 is showing the principle of how such packaging containers are manufactured from the packaging laminate in a continuous form, fill and seal process.

In FIG. 1a there is thus shown, in cross-section, an example of a laminated packaging material 10a for aseptic packaging and long-term storage under ambient conditions. A paperboard for liquid food packaging, so-called liquid paperboard 11, has a pre-coating 12, which made the outer surface of the paperboard 11 receptive to an aqueous type pigment-based inkjet ink layer 13, has an extrusion-coated outermost heat sealable layer of low density polyethylene 14, applied after the pre-coat and print operations onto the printed décor layer 13. On the opposite side of the liquid paperboard core layer, an aluminium foil gas barrier 15 is laminated to the paperboard by means of an interjacent layer of polyolefin 16, preferably low density polyethylene or functionalised polyethylene copolymer. An innermost liquid tight and heat sealable layer 17 of low density polyethylene, preferably blended or copolymerised with a linear low density polyethylene in order to optimise sealing properties, is applied, most commonly by means of extrusion coating onto the inside of the aluminium foil.

FIG. 1b shows a similar packaging laminate 10b as described in FIG. 1a, with the difference that the substrate that is pre-coated 12 and printed by an ink-jet décor layer 13, is a premanufactured, biaxially oriented film of polyethylene terephthalate (BOPET) or polypropylene (BOPP) 18, which is laminated to a liquid paperboard 11, by means of a suitable adhesive or an interjacent extrusion lamination polyolefin 19, and finally extrusion coated by the outermost heat sealable layer 14. The inside layers essentially remaining the same or similar, since the package is intended for the similar purpose of liquid good or beverage packaging.

FIG. 2 schematically shows how the pre-coating may be applied according to a preferred embodiment of the invention, i.e. by means of a flexographic method employing an anilox roller for transfer of the aqueous pre-coating composition to the substrate surface. The anilox roll 1 is rotated in the direction of rotation of the arrow, partly within the pre-coating composition chamber 3 positioned axially along the roll 1 for taking up the pre-coating solution in the cells engraved on the circumferential surface of the roll 1. Picked up excess of the pre-coating solution is scraped off from the roll 1 by an upper doctor blade (obscured in the figure) abutting against the circumferential surface, on exit from the ink chamber 3. The pre-coating composition thus remaining in the engraved cells accompanies the rotating anilox roll 1 and is transferred to an impression cylinder 2 rotating in transfer contact with the anilox roll 1. The pre-coating composition thus transferred to the impression cylinder 2 accompanies the rotating impression cylinder 2 for transfer to a web substrate surface 16 which is led through the nip between the impression cylinder 2 and a counter pressure cylinder 17 rotating adjacent the impression cylinder 2. After drying of the transferred pre-coating composition on the surface of the web, the web is forwarded for further processing, i.e. to the ink-jet printing station in accordance with the invention.

FIG. 3 shows schematically a method 30 of manufacturing the laminated packaging material of FIG. 1a. A roll of paperboard is passing a pre-coating anilox roller application station, i.e. a flexographic printing station in order to apply the aqueous pre-coating composition in a thin, even layer, and is subsequently lead through a drying station for evaporating off the water of the applied coating. In the next step the pre-coated web is forwarded through an inkjet printing station with multiple colours corresponding to the CMYK colour set-up and is printed according to a digitally signalled and controlled printing pattern. After the ink-jet printer, a final drying station dries the thus applied inkjet décor layer. In a final step, for the part of the packaging material that is on the outside of the paperboard, a heat sealable and liquid tight low density polyethylene (LDPE) is applied onto the printed décor layer by extrusion coating.

The laminate layers of the inside may be applied before or after the printing operation and the extrusion coating of the outermost polyethylene layer, and are most commonly laminated by extrusion lamination of the aluminium foil to the paperboard and subsequently coating the inside of the aluminium foil with the innermost heat sealable polyethylene layers (not shown in FIG. 3).

Alternatively, the laminated packaging material of FIG. 1b is manufactured by a preceding lamination step (not shown), in which a pre-manufactured polymer film is laminated to a core layer of paper or paperboard, such as liquid paperboard, by means of a suitable adhesive or an interjacent extrusion lamination polyolefin, thus bonding the not-to-be-printed side of the film and the paperboard to each other. The other, outer, side of the polymer film is then pre-coated by passing the laminate of paper and polymer film through a pre-coating anilox roller application station 31, i.e. a flexographic printing station in order to apply the aqueous pre-coating composition in a thin, even layer. In the next step the pre-coated web is forwarded through a drying station 32 to at least partly dry the pre-coating by evaporating off the water, whereafter the web is lead to an inkjet printing station 33 with multiple colours corresponding to the CMYK colour set-up and is printed according to a digitally signalled and controlled printing pattern. After the ink-jet printer, a final drying station 34 dries the thus applied pre-coating and inkjet décor layer are finally dried altogether. In a final step, for the part of the packaging material that is on the outside of the paperboard, a heat sealable and liquid tight low density polyethylene (LDPE) is applied onto the printed décor layer by means of extrusion coating in a melt extrusion station 35.

The laminate layers of the inside may be applied before or after the printing operation and the extrusion coating of the outermost polyethylene layer, and are most commonly laminated by extrusion lamination of the aluminium foil to the paperboard and subsequently coating the inside of the aluminium foil with the innermost heat sealable polyethylene layers (not shown).

FIG. 4a shows a preferred example of a packaging container 40 produced from any of the packaging laminates 10 according to the invention. The packaging container is particularly suitable for beverages, sauces, soups or the like. Typically, such a package has a volume of about 100 to 1000 ml. It may be of any configuration, but is preferably brick-shaped, having longitudinal and transversal seals 41 and 42, respectively, and optionally an opening device 43. In another embodiment, not shown, the packaging container may be shaped as a wedge. In order to obtain such a "wedge-shape", only the bottom part of the package is fold formed such that the transversal heat seal of the bottom is hidden under the triangular corner flaps, which are folded and sealed against the bottom of the package. The top section transversal seal is left unfolded. In this way the half-folded packaging container is still is easy to handle and dimensionally stable when put on a shelf in the food store or on a table or the like.

FIG. 4b shows an alternative, preferred example of a packaging container 40b produced from the packaging laminates 10 according to the invention. Since the packaging laminate for this type of package is thinner by having a thinner paper core layer, it is not dimensionally stable enough to form a parallelepipedic packaging container, and is not fold formed after transversal sealing 42b. It will thus remain a pillow-shaped pouch-like container and distributed and sold like this.

FIG. 5 shows the principle as described in the introduction of the present application, i.e. a web of packaging material is formed into a tube 51 by the longitudinal edges 52, 52' of the web being united to one another in an overlap joint 53. The tube is filled 54 with the intended liquid food product and is divided into individual packages by repeated transversal seals 55 of the tube at a pre-determined distance from one another below the level of the filled contents in the tube. The packages 56 are separated by incisions in the transversal seals and are given the desired geometric configuration by fold formation along prepared crease lines in the material.

The invention is not limited by the embodiments shown and described above, but may be varied within the scope of the claims.

EXAMPLES

Lamination experiments were made on samples made from pre-coating bare liquid paperboards with similar pre-coating compositions having only differences in salt concentration of the aqueous pre-coating composition.

Substrate samples 1-3 were thus pre-coated with an aqueous pre-coating composition comprising a binder of PVOH with a saponification degree of 88% (GH17 PVA) a dialdehyde crosslinking compound and a salt concentration of 2 wt % CaCl2, to the dry coating weights as listed in table 1.

Substrate sample 4 was pre-coated with a composition comprising CaCl2 salt only, without a polymer binder, at a solution concentration of 10 wt %.

The pre-coated samples were dried, and subsequently extrusion coated with a layer of 12 g/m2 of LDPE, and the adhesion was measured as soon as possible after the lamination.

It had been seen in previous test runs, where conventional and much higher amounts of salt was pre-coated onto the paperboard, that the initial adhesion of the extrusion coated thermoplastic layer of LDPE was very bad, or non-existing, and only a minimal force directed to it caused the LDPE layer to fall off. Strangely enough, when the samples had been allowed to lie still for a few weeks, the adhesion was improved to almost an acceptable level. It has thus been seen that it is important to measure the adhesion within one week after the extrusion coating of the LDPE layer onto the pre-coating and subsequently printed surface. Furthermore, it had been seen that there was good initial adhesion also when a pre-coating solution was not used, i.e. there was no fixing salt applied to the surface to be printed. A fixing salt pre-treatment is, however, necessary for the subsequent printing performance in terms of image quality.

The adhesion properties between the outer extrusion coating layers and the printed pre-coated substrate are obtained through an internal peel test approach based on 180 degree peeling using a tensile tester, preferably an Instron® tester or a like.

| Paperboard substrate sample | Dry total coating weight (g/m$^2$) | Coating weight of salt (g/m$^2$) | Adhesion to LDPE covering layer (N/m) |
|---|---|---|---|
| 1 | 0.15 | 0.040 | 82 |
| 2 | 0.21 | 0.055 | 70 |
| 3 | 0.37 | 0.100 | 37 |
| 4 | 0.15 | 0.140 | 0 |

The conclusion from these and further examples, is that the salt concentration should be very low, compared to what has previously been believed, in order to achieve the necessary adhesion to the polyethylene outermost coating layer, for laminated packaging material suitable for liquid food packaging.

The invention claimed is:
1. A laminated packaging material for food packaging, comprising a substrate layer, which on the substrate surface of its first side, intended to be directed towards the outside of a packaging container made from the packaging material, has applied to it, in the following order, a pre-coating for receiving a printed décor layer of an aqueous pigment-based ink-jet printing ink, a pigment-based ink-jet printed décor layer and further laminated onto the printed décor layer, an outermost layer of a thermoplastic polymer, the pre-coating composition comprising:
an aqueous soluble multivalent cation salt and a polymer binder in which the applied salt concentration at the substrate surface is from 0.02 g/m$^2$ to 0.05 g/m$^2$ dry coating weight, and the weight ratio of the multivalent cation salt to the polymer binder is 1:10 to 2:5 calculated on solid matter;
the pre-coating composition is applied onto the substrate surface at from 0.1 g/m$^2$ to 0.5 g/m$^2$ total dry coating weight; and
the multivalent cation salt is CaCl$_2$.
2. Laminated packaging material according to claim 1, wherein the polymer binder is a hydrophilic polymer.
3. Laminated packaging material according to claim 1, wherein the weight ratio of the multivalent cation salt to the polymer binder is 1:5 to 2:5 calculated on solid matter.
4. Laminated packaging material according to claim 1, wherein the pre-coating composition is applied onto the substrate surface at from 0.1 g/m$^2$ to 0.3 g/m$^2$.
5. Laminated packaging material according to claim 1, wherein the polymer binder is a polymer selected from the group consisting of polyvinyl alcohol (PVOH) or modified polyvinylalcohol, water dispersible ethylene vinyl alcohol (EVOH), polysaccharides, including cellulose, cellulose derivatives, CMC, starch and starch derivatives, acrylic-based (co-)polymers and combinations of two or more thereof.
6. Laminated packaging material according to claim 1, wherein the polymer binder is crosslinked.
7. Laminated packaging material according to claim 1, wherein the substrate is a paper or paperboard constituting a core layer of the laminated packaging material.
8. Laminated packaging material according to claim 1, wherein the substrate layer is further laminated to an innermost layer of a thermoplastic polymer on its second side, which is intended to be directed towards the inside of a packaging container.
9. Laminated packaging material according to claim 8, further comprising a gas barrier layer between the substrate layer and the innermost layer.
10. Laminated packaging material according to claim 1, wherein the polymer binder comprises a cross-linked aceto-acetylated polyvinyl alcohol.
11. Laminated packaging material according to claim 1, wherein the polymer binder comprises a polyvinyl alcohol having a saponification degree of from 79% to 99.99%.
12. Laminated packaging material according to claim 1, wherein the polymer binder is cross-linked with a dialdehyde compound, preferably glyoxal.
13. Laminated packaging material according to claim 1, wherein the polymer binder is cross-linked with glyoxal.
14. Laminated packaging material according to claim 1, wherein the ink-jet ink is an aqueous pigment-based ink.
15. A laminated packaging material for food packaging, comprising a substrate layer, which on the substrate surface of its first side, intended to be directed towards the outside of a packaging container made from the packaging material, has applied to it, in the following order, a pre-coating for receiving a printed décor layer of an aqueous pigment-based ink-jet printing ink, a pigment-based ink-jet printed décor layer and further laminated onto the printed décor layer, an outermost layer of a thermoplastic polymer, the pre-coating composition comprising:

an aqueous soluble multivalent cation salt and a polymer binder in which the applied salt concentration at the substrate surface is from 0.02 g/m² to 0.05 g/m² dry coating weight, and the weight ratio of the multivalent cation salt to the polymer binder is 1:10 to 2:5 calculated on solid matter;

the pre-coating composition is applied onto the substrate surface at from 0.1 g/m² to 0.5 g/m² total dry coating weight;

the multivalent cation salt is calcium, magnesium or aluminium salt with a chloride or acetate counter ion; and the concentration of the multivalent cation salt is at a calcium ion equivalent to from 0.02 g/m² to 0.1 g/m² of calcium chloride.

16. Method of manufacturing a laminated packaging material comprising:

continuously applying a pre-coating composition onto a substrate surface of a moving substrate to produce a pre-coated substrate web, the pre-coating composition being comprised of an aqueous soluble multivalent cation salt and a polymer binder in which the applied salt concentration at the substrate surface is from 0.02 g/m² to 0.05 g/m² dry coating weight, and the weight ratio of the multivalent cation salt to the polymer binder is 1:10 to 2:5 calculated on solid matter;

transporting the pre-coated substrate web through a drying station to at least partially dry the applied pre-coating composition by evaporating off water;

printing an aqueous pigment-based ink-jet décor layer onto the pre-coated substrate surface after transporting the pre-coated substrate web through the drying station to produce a pre-coated and printed substrate web;

transporting the pre-coated and printed substrate web through a drying station to evaporate off water from the printed décor layer; and applying a layer of a thermoplastic polymer onto the pre-coated and printed substrate web after transporting the pre-coated and printed substrate web through the drying station.

17. Method according to claim 16, wherein the polymer binder is a hydrophilic polymer.

18. Method according to claim 16, wherein the weight ratio of the multivalent cation salt to the polymer binder is 1:5 to 2:5 calculated on solid matter.

19. Method according to claim 16, wherein the pre-coating composition is applied onto the substrate surface at from 0.1 g/m² to 0.3 g/m².

20. Method according to claim 16, wherein the polymer binder is a polymer selected from the group consisting of polyvinyl alcohol (PVOH) or modified polyvinylalcohol, water dispersible ethylene vinyl alcohol (EVOH), polysaccharides, including cellulose, cellulose derivatives, CMC, starch and starch derivatives, acrylic-based (co-)polymers and combinations of two or more thereof.

* * * * *